United States Patent [19]

Jeanes et al.

[11] Patent Number: 4,988,371
[45] Date of Patent: Jan. 29, 1991

[54] NOVEL ALICYCLIC POLYIMIDE GAS SEPARATION MEMBRANES

[75] Inventors: Thomas O. Jeanes, Antioch; John D. Summers, Walnut Creek; Edgar S. Sanders, Jr., Pittsburg, all of Calif.

[73] Assignee: The Dow Chemical Company, Midland, Mich.

[21] Appl. No.: 406,675

[22] Filed: Sep. 12, 1989

[51] Int. Cl.$^5$ .................. B01D 53/72; B01D 71/64
[52] U.S. Cl. ............................. 55/16; 55/68; 55/158
[58] Field of Search ............... 55/16, 68, 158; 210/500.39

[56] References Cited

U.S. PATENT DOCUMENTS

| 3,822,202 | 7/1974 | Hoehn | 55/16 X |
|---|---|---|---|
| 3,925,211 | 12/1975 | Schumann et al. | 264/41 X |
| 4,240,914 | 12/1980 | Iwama et al. | 264/41 X |
| 4,358,378 | 11/1982 | Iwama et al. | 264/41 X |
| 4,378,400 | 3/1983 | Makino et al. | 55/16 X |
| 4,440,643 | 4/1984 | Makino et al. | 55/158 X |
| 4,454,310 | 6/1984 | Oka et al. | 528/188 |
| 4,474,662 | 10/1984 | Makino et al. | 55/158 X |
| 4,474,858 | 10/1984 | Makino et al. | 55/158 X |
| 4,512,893 | 4/1985 | Makino et al. | 55/158 X |
| 4,532,041 | 7/1985 | Shuey et al. | 585/818 X |
| 4,639,485 | 1/1987 | Frayer | 524/378 |
| 4,690,873 | 9/1987 | Makino et al. | 55/158 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,838,900 | 6/1989 | Hayes | 55/158 X |
| 4,847,311 | 7/1989 | Yamaya et al. | 524/413 |
| 4,857,079 | 8/1989 | Kimura | 55/16 |
| 4,880,699 | 11/1989 | Kohn | 428/333 |

FOREIGN PATENT DOCUMENTS

| 113574 | 7/1984 | European Pat. Off. | |
| 160140 | 11/1985 | European Pat. Off. | |
| 241937 | 10/1987 | European Pat. Off. | |
| 264229 | 4/1988 | European Pat. Off. | |
| 0321638 | 6/1989 | European Pat. Off. | 55/158 |
| 57-170936 | 10/1982 | Japan | |
| 58-05344 | 1/1983 | Japan | |
| 58-008512 | 1/1983 | Japan | 55/158 |
| 58-092446 | 6/1983 | Japan | 55/158 |
| 59-098704 | 6/1984 | Japan | |
| 59-225705 | 12/1984 | Japan | 55/158 |
| 60-082103 | 5/1985 | Japan | 55/158 |
| 60-125209 | 7/1985 | Japan | |
| 60-150806 | 8/1985 | Japan | |
| 60-257805 | 12/1985 | Japan | |
| 61-103521 | 5/1986 | Japan | |
| 61-133106 | 6/1986 | Japan | |
| 61-133117 | 6/1986 | Japan | 55/158 |
| 62-038207 | 2/1987 | Japan | |
| 62-061602 | 3/1987 | Japan | |
| 62-074410 | 4/1987 | Japan | |
| 62-074434 | 4/1987 | Japan | |
| 62-114611 | 5/1987 | Japan | |
| 62-163712 | 7/1987 | Japan | |
| 62-216622 | 9/1987 | Japan | |
| 62-227422 | 10/1987 | Japan | 55/158 |
| 62-231017 | 10/1987 | Japan | |
| 63-019212 | 1/1988 | Japan | |
| 63-028424 | 2/1988 | Japan | |
| 63-166415 | 7/1988 | Japan | 55/158 |

OTHER PUBLICATIONS

Koros et al., "Relationship Between Gas Separation Properties and Chemical Structure in a Series of Aromatic Polyimides," *Jounral of Membrane Science*, vol. 37, 1988, pp. 45–62.

O'Brien et al., "Influence of Casting and Curing Conditions on Gas Sorption and Transport in Polyimide Films," *Polymer Engineering and Science*, vol. 27, No. 3, Feb. 1987, pp. 211–217.

Kim et al., "Advanced Gas Separation Membrane Materials: Rigid Aromatic Polyimides," *Fifth Symposium on Separation Science and Technology for Energy Applications*, Oct. 26–29, 1987.

Moe et al., "Effects of Film History on Gas Transport in a Fluorinated Aromatic Polyimide," *Journal of Applied Polymer Science*, vol. 36, 1988, pp. 1833–1846.

"Polyimides," *Encyclopedia of Polymer Science and Engineering*, vol. 12, John Wiley & Sons, New York, N.Y., 1988, pp. 364–383.

"Polyimides," *Kirk–Othmer Encyclopedia of Chemical Technology*, 3rd Edition, vol. 18, John Wiley & Sons, New York, N.Y. 1982, pp. 704–719.

Primary Examiner—Robert Spitzer

[57] ABSTRACT

This invention relates to novel polyimide gas separation membranes derived from alicyclic dianhydrides and aliphatic, alicyclic, or aromatic diamines, and a process for using such membranes.

17 Claims, No Drawings

NOVEL ALICYCLIC POLYIMIDE GAS SEPARATION MEMBRANES

BACKGROUND OF THE INVENTION

This invention relates to novel polyimide gas separation membranes derived from alicyclic dianhydrides. This invention further relates to a process of separating gases using said membranes.

Membranes have been used to recover or isolate a variety of gases, including hydrogen, helium, oxygen, nitrogen, carbon monoxide, carbon dioxide, water vapor, hydrogen sulfide, ammonia, and light hydrocarbons. Applications of particular interest include the separation of hydrogen or helium from gas mixtures such as gas mixtures containing nitrogen, carbon monoxide, carbon dioxide, water vapor, and/or light hydrocarbons. For example, the separation and recycle of hydrogen is often necessary in various hydrocracker, hydrotreater, and catalytic cracking processes used in the oil refinery industry. Membranes can be used to achieve such separations.

Such membrane separations are based on the relative permeability of two or more gaseous components through the membrane. To separate a gas mixture into two portions, one richer and one leaner in at least one component, the mixture is brought into contact with one side of a semi-permeable membrane through which at least one of the gaseous components selectively permeates. A gaseous component which selectively permeates through the membrane passes through the membrane more rapidly than at least one other component of the gas mixture. The gas mixture is thereby separated into a stream which is enriched in the selectively permeating component or components and a stream which is depleted in the selectively permeating component or components. A relatively non-permeating component passes more slowly through the membrane than at least one other component of the gas mixture. An appropriate membrane material is chosen for the gas mixture so that some degree of separation of the gas mixture can be achieved.

Membranes for gas separation, particularly hydrogen separation, have been fabricated from a wide variety of polymeric materials, including cellulose esters, aromatic polyimides, polyaramides, polysulfones, polyethersulfones, polyesters, and polycarbonates. An ideal gas separation membrane is characterized by the ability to operate under high temperature and/or pressure while possessing a high gas separation factor (selectively) and high gas permeability. Gas separation membranes also are preferably fabricated from polymers which are easily processed. The problem is finding membrane materials which possess all the desired characteristics. Polymers possessing high separation factors generally have low gas permeabilities, while those polymers possessing high gas permeabilities generally have low separation factors. In the past, a choice between a high gas separation factor and a high gas permeability has been unavoidably necessary. Furthermore, some of the polymeric membrane materials previously used suffer from the disadvantage of poor performance under high operating temperatures and pressures. However, those polymeric membrane materials capable of operating at high temperatures and pressures are typically difficult to fabricate into membranes. A membrane capable of separating gas mixtures which possesses high selectivity, high gas permeability, ability to operate under extreme conditions of temperature and pressure, and ease of fabrication is needed.

SUMMARY OF THE INVENTION

The invention is a semi-permeable gas separation membrane comprising a thin discriminating layer of a polyimide corresponding to the formula:

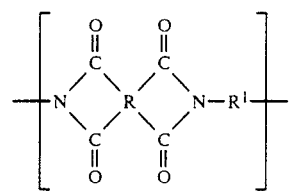

wherein R is the tetravalent residue of an alicyclic dianhydride in which:
A. both anhydride moieties of the dianhydride are directly attached to the alicyclic ring structure through ortho-linkages, or
B. one anhydride moiety of the dianhydride is directly attached to the alicyclic ring structure through ortho-linkages and the alicyclic ring structure possesses at least one degree of unsaturation; and
$R^1$ is the divalent residue of an aliphatic, alicyclic, or aromatic diamine.

In another aspect, the invention is a process of separating gases comprising:
(1) contacting one side of a semi-permeable gas separation membrane with a feed gas mixture under pressure, wherein the membrane divides a separation chamber into a high pressure side into which the feed gas mixture is fed and a low pressure side;
(2) maintaining a pressure differential across the membrane under conditions such that at least one component in the feed gas mixture selectively permeates through the membrane from the high pressure side to the low pressure side of the membrane;
(3) removing from the low pressure side of the membrane permeated gas which is enriched in the selectively permeating component(s); and
(4) removing from the high pressure side of the membrane non-permeated gas which is depleted in the selectively permeating component(s);
wherein the membrane comprises a thin discriminating layer of the polyimide defined above.

The alicyclic polyimide membranes of this invention possess high gas selectivities and high gas permeabilities. The membranes are easily fabricated and may be operated at high temperatures and high pressures.

DETAILED DESCRIPTION OF THE INVENTION

The membranes of this invention are fabricated from polyimides derived from alicyclic dianhydrides and aliphatic, alicyclic, or aromatic diamines.

The membranes of this invention comprise a thin discriminating layer of a polyimide corresponding to repeat units of Formula I:

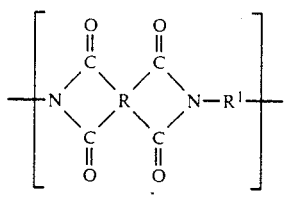

wherein R is the tetravalent residue of an alicyclic dianhydride in which:
A. both anhydride moieties of the dianhydride are directly attached to the alicyclic ring structure through ortho-linkages, or
B. one anhydride moiety of the dianhydride is directly attached to the alicyclic ring structure through ortho-linkages and the alicyclic ring structure possesses at least one degree of unsaturation; and $R^1$ is the divalent residue of an aliphatic, alicyclic, or aromatic diamine.

R is preferably the tetravalent residue of an unsubstituted or inertly substituted alicyclic dianhydride, wherein said dianhydride is selected from the group consisting of:

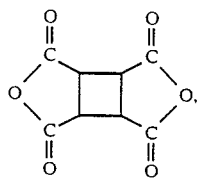

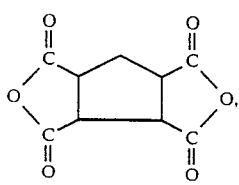

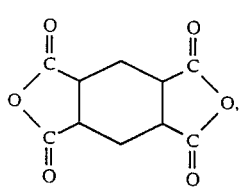

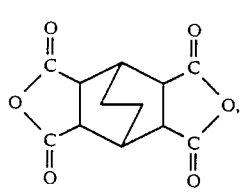

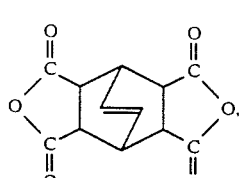

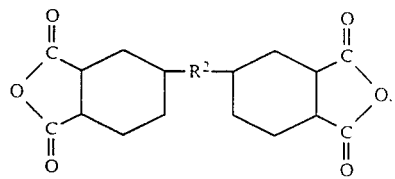

wherein $R^2$ is —, —O—, —CO—, —S—, —$SO_2$—,

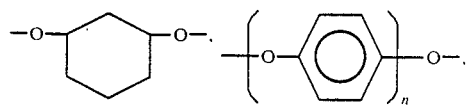

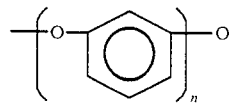

a $C_{1-6}$ divalent hydrocarbon radical, or a $C_{1-6}$ halo-substituted hydrocarbon radical, and n is 1, 2, or 3,

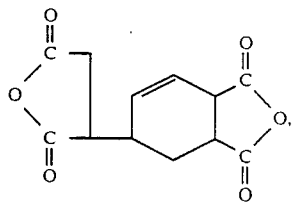

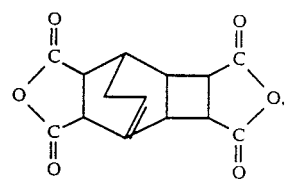

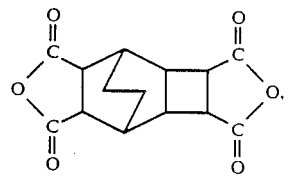

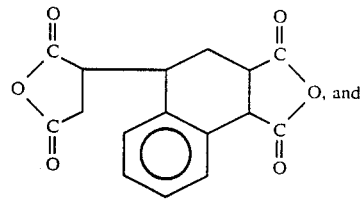

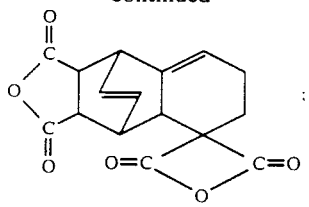

wherein the inertly substituted groups on the dianhydride comprise $C_{1-4}$ alkyl.

R is more preferably the tetravalent residue of an alicyclic dianhydride, wherein said dianhydride is selected from the group consisting of:

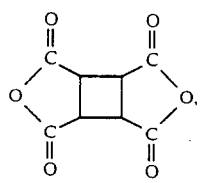

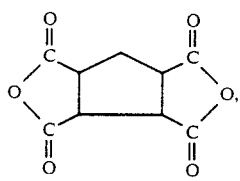

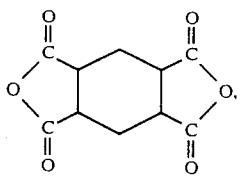

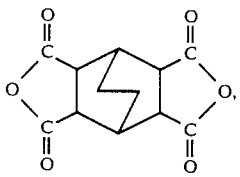

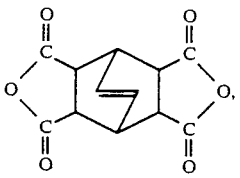

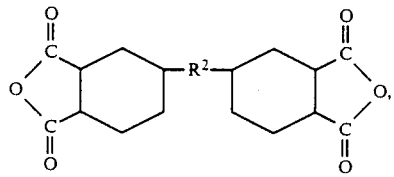

wherein $R^2$ is —, —O—, —CO—, —S—, —SO$_2$—,

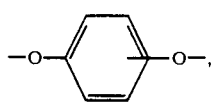

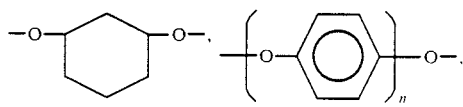

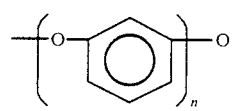

a $C_{1-6}$ divalent hydrocarbon radical, or a $C_{1-6}$ halo-substituted hydrocarbon radical, and n is 1, 2, or 3, and

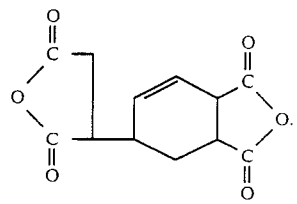

$R^1$ is preferably the divalent residue of an alicyclic or aromatic diamine, more preferably an aromatic diamine. Preferred divalent aromatic residues for $R^1$ include divalent residues of aromatic diamines selected from the group consisting of:

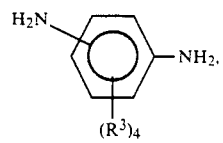

wherein $R^3$ is independently in each occurrence hydrogen, a $C_{1-4}$ alkyl, or a halogen,

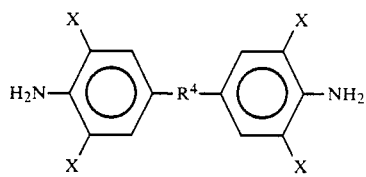

or

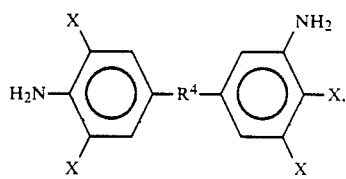

wherein $R^4$ is —, —O—, —CO—, —SO$_2$—, —S—,

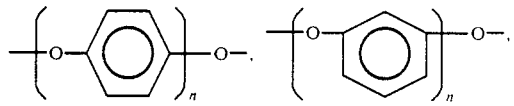

a $C_{1-6}$ divalent hydrocarbon radical, or a $C_{1-6}$ halo-substituted hydrocarbon radical, X is independently in each occurrence hydrogen, a $C_{1-4}$ alkyl, or a halogen, and n is 1, 2, or 3; and

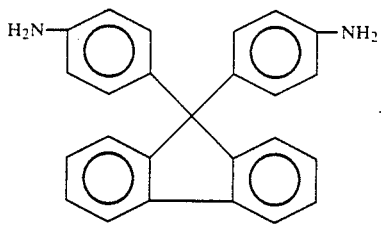

The dianhydrides and diamines useful in preparing the polyimides useful in this invention are commercially available or readily prepared by conventional synthesis techniques.

The alicyclic dianhydrides useful in this invention may readily be prepared by conventional techniques, such as via hydrogenation of the corresponding aromatic dianhydride or conversion from the tetracarboxylic acid analog. For example, the alicyclic dianhydride may be prepared by hydrogenating the aromatic dianhydride analog in the presence of a rhodium catalyst in an organic phase containing a phase transfer catalyst, such as a quaternary ammonium salt, and a buffer solution. See Krzystof, et al., "Exceedingly Mild, Selective and Stereospecific Phase-Transfer-Catalyzed Hydrogenation of Arenes," *Organometallics*, 1983, pp. 1055–1057, the relevant portions incorporated herein by reference, which describes a similar hydrogenation process for arenes. The alicyclic dianhydrides may be prepared from the tetracarboxylic acid analog by dehydrating the tetracarboxylic acid at elevated temperatures in the presence of acetic anhydride. For discussions of preparation methods for tetracarboxylic acids and conversion to dianhydrides, see, for example, U.S. Pat. Nos. 3,242,206 and 3,444,237, French Patent reference 1,555,625 (Chemical Abstract No. 72:78529K) and Russian Patent reference 433,128 (Chemical Abstract No. 81:91042b); the relevant portions incorporated herein by reference.

With respect to the diamines, see "Amines," *Encyclopedia of Chemical Technology*, 3rd edition, Vol. 2, John Wiley & Sons, New York, N.Y., 1978 pp. 295–308, 321–338, the relevant portions incorporated herein by reference. See also, "Diamines," *Encyclopedia of Chemical Technology*, 3rd edition, Vol. 7, John Wiley & Sons, New York, N.Y., 1979, pp. 580–602, the relevant portions incorporated herein by reference.

Some of the polyimides useful in this invention may be prepared by conventional two step polyimide polymerization techniques whereby a dianhydride is reacted with a diamine in a polar solvent to form the corresponding polyamic acid, which is then thermally or chemically cyclized to the polyimide. Suitable polar solvents include dimethylformamide, dimethylacetamide, dimethylsulfoxide, N-methyl-2-pyrrolidinone, and m-cresol. Thermal imidization is usually carried out between about 150° and 300° C. Chemical imidization uses a dehydrating agent such as acetic acid in pyridine. See "Polyimides," *Encyclopedia of Polymer Science and Engineering*, Vol. 12, John Wiley & Sons, New York, N.Y., 1988, pp. 364–383 and "Polyimides," *Encyclopedia of Chemical Technology*, 3rd edition, Vol. 18, John Wiley & Sons, New York, N.Y., 1982, pp. 704–719; the relevant portions relating to polyimide synthesis incorporated herein by reference.

The polyimides useful in this invention alternately may be formed by a single step solution polymerization process in which an appropriate amount of the alicyclic dianhydride is reacted with an appropriate amount of the diamine in a solution comprising a dipolar aprotic solvent and a dehydrating agent such as N-cyclohexyl-2-pyrrolidinone. The ratio of dianhydride to diamine used is preferably between about 0.95 and about 1.05, more preferably between about 0.99 and about 1.01. Examples of preferred dipolar aprotic solvents include dimethylacetamide, dimethylformamide, dimethylsulfoxide, sulfolane, N-methyl-2-pyrrolidinone, hexamethyl-phosphoramide, and N-cyclohexyl-2-pyrrolidinone. The same compound may be capable of serving as both the solvent and the dehydrating agent. The ratio of dipolar aprotic solvent to dehydrating agent is between about 0:100 and about 90:10. The solution is preferably heated under an inert atmosphere to between about 120° and about 265° C., more preferably between about 175° and 195° C. for a time sufficient to polymerize the reactants to a useful extent, preferably between about 2 hours and 4 days, more preferably between about 8 hours and about 3 days. The weight of polymer in solution is preferably between about 5 and about 30 weight percent, more preferably between about 10 and about 25 weight percent. The polymer is precipitated from the solution with a non-solvent such as an alcohol and dried. The polyimides so formed are generally soluble in common solvents such as dimethylacetamide, N-methyl-2-pyrrolidinone, dimethylformamide, dimethylsulfoxide, sulfolane, hexamethylphosphoramide, N-cyclohexyl-2-pyrrolidinone, chlorinated hydrocarbons, toluene, and ethers.

The membranes of this invention can take any form known to one skilled in the art. In particular, the membrane may be a homogeneous membrane, a composite membrane, or an asymmetric membrane. Asymmetric and composite membranes are preferred; asymmetric membranes are more preferred.

Homogeneous membranes are prepared by forming a thin discriminating layer which is dense and free of voids and pores. Such membranes possess a discriminating layer which generally has the same structure and composition throughout the membrane. In one preferred embodiment, the polyimides useful in this invention are dissolved in a solvent, thus forming a polymer/solvent solution which is cast onto a uniform surface from which the membrane may thereafter be readily separated. Preferred casting solvents for the polyimides of this invention include dimethylacetamide, N-methyl-2-pyrrolidinone, dimethylformamide, dimethylsulfoxide, sulfolane, hexamethylphosphoramide, N-cyclohexyl-2-pyrrolidinone, chlorinated hydrocarbons, toluene, and ethers; more preferred solvents include dimethylacetamide, dimethylsulfoxide, N-cyclohexyl-2-pyrrolidinone, N-methyl-2-pyrrolidinone, and dimethylformamide. The polymer/solvent solution should be homogeneous and possess sufficient viscosity to allow casting of the solution onto a uniform surface. Preferably the solution of polymer/solvent contains polymer in weight percents of between about 5 and about 40, more preferably of between about 10 and about 30, even more preferably of between about 10 and about 25.

The solution is cast onto a uniform surface possessing a low surface energy such as silicone or coated glass, or a surface to which the membrane will not adhere such as mercury, or a liquid with which the polymer is substantially immiscible such as water. Alternately, the membrane may be cast onto a surface which may be dissolved away from the membrane following curing and drying. Casting is performed by pouring the solution onto the appropriate surface and using an appropriate tool to form a film of the appropriate thickness. A continuous casting process may be achieved by casting the solution onto endless belts or rotating drums. Thereafter, the cast solution is exposed to curing or drying conditions. Such conditions are used to substantially remove the solvent, thereby leaving a thin discriminating layer of polymer which is homogeneous. The solution may be cured or dried either by exposure to a vacuum, exposure to elevated temperatures, by allowing the solvent to evaporate over time, or any combination thereof. Generally, it is preferable to expose the cast solution to elevated temperatures which are below the glass transition temperature of the polyimide, preferably less than about 350° C., more preferably less than about 300° C.

Composite membranes are prepared by forming a thin discriminating layer on a porous supporting layer. Such membranes possess a discriminating layer which generally has a different structure and composition than the porous supporting layer. To prepare a composite membrane, a homogeneous discriminating layer can be formed and thereafter adhered to a porous supporting layer. Alternatively, the porous supporting layer can be the surface upon which the discriminating layer is cast. In such an embodiment, the composite membrane is prepared by casting a solution as a coating on the porous support. Penetration of the polymer from which the discriminating layer is formed into the pores of the porous supporting layer is acceptable so long as the desired thickness of the membrane is not exceeded. The porous supporting layer is characterized in that it preferably does not significantly impede the transport of gas through the membrane. In one embodiment, the porous supporting layer can be a metal or polymeric plate with a plurality of holes drilled through it. However, such a drilled plate is not advantageous because it may significantly reduce the effective area of the membrane. In a preferred embodiment, the porous supporting layer is a porous polymeric membrane. Examples of such porous polymeric membranes suitable as porous supporting layers in composite membranes include porous cellulose ester and polysulfone porous membranes commercially available under the tradenames MILLIPORE, PELLICONE, and DIAFLOW. Where such porous supporting membranes are thin or highly deformable, a frame or screen may also be used to adequately support the membrane. In one especially preferred embodiment, the porous polymeric supporting layer is a hollow fiber of a porous polymeric membrane such as a microporous polysulfone membrane. The hollow fiber itself provides adequate support for the discriminating layer coated on the inside or the outside surface of the hollow fiber. After the solution is cast onto the porous supporting layer to form the thin discriminating layer, the membrane is then exposed to curing or drying conditions to substantially remove solvent from the discriminating layer such as described hereinbefore for the formation of homogeneous membranes.

Asymmetric membranes are prepared by forming a thin discriminating layer on a porous supporting layer. Such membranes possess a discriminating layer which generally has the same composition but a different structure than the porous supporting layer. To prepare an asymmetric membrane, a solution of polymer and solvent is formed and cast as hereinbefore described for homogeneous membranes. The cast solution is partially cured to remove a portion of the solvent. Thereafter, one or both surfaces of the partially cured membrane is contacted with a non-solvent for the polymer such as water so as to form a thin discriminating layer on one or both sides of the membrane while substantially removing the solvent. The porous supporting layer formed provides support for the thin discriminating layer without significantly impeding the transport of gas through the membrane. The drying step is performed in a manner similar to that described hereinbefore with respect to the formation of homogeneous membranes.

Flat sheet, tubular, and hollow fiber membranes which are homogeneous, composite, or asymmetric may be formed by extrusion from an appropriate solution of the polyimide in a solvent. Such extrusion processes are well known to those skilled in the art and the formation of such membranes requires the adaptation of the hereinbefore described techniques.

Extrusion is the preferred process for the fabrication of flat sheet, tubular, or hollow fiber membranes. In the case of extrusion, the components of the extrusion mixture may be combined prior to extrusion by mixing in any convenient manner with conventional mixing equipment, as for example, in a Hobart mixer. Alternately, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a melt-pot or twin screw extruder and extruded into membranes in a single step.

The polyimide and solvent mixture is heated to a temperature at which the mixture becomes a homogeneous fluid. The homogeneous fluid is then extruded through a sheet, hollow tube, or hollow fiber die (spinnerette). Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid may be a gas such as nitrogen, air, carbon dioxide, or other inert gas, or a liquid which is a non-solvent for the polyimide such as water. Following extrusion, the membrane is treated as hereinbefore described for homogeneous, composite, or asymmetric membranes.

In one preferred embodiment, the membranes are annealed before use. The membrane is preferably exposed to temperatures above about 100° C. and below about 350° C. for a period of time to partially densify the polymer. This procedure may optionally be performed under vacuum.

Preferably, the homogeneous membranes useful in This invention have a thickness of between about 5 and about 500 microns, more preferably between about 10 and about 150 microns. Hollow fiber homogeneous membranes preferably have an outer diameter of between about 50 and about 800 microns, more preferably between about 100 and about 300 microns. Preferably the discriminating layer in composite or asymmetric membranes possesses a thickness of between about 0.02 and about 10 microns, more preferably between about 0.02 and about 2 microns. Preferably the supporting layer in composite or asymmetric membranes possesses a thickness of between about 5 and about 500 microns, more preferably between about 10 and about 150 microns. Hollow fiber composite or asymmetric membranes preferably have an outer diameter in the range of from about 50 to about 800 microns, more preferably in the range of from about 100 to about 300 microns.

The membranes are fabricated into flat sheet, spiral wound, tubular, or hollow fiber devices by methods known in the art. See U.S. Pat. Nos. 3,228,876; 3,422,008; 3,455,460; 3,475,331; 3,526,001; 3,528,553; 3,690,465; 3,702,658; 3,755,034; 3,801,401; 4,271,900; 3,872,014; 3,966,616; 4,045,851; 4,061,574; 4,080,296; 4,083,780; 4,220,535; 4,235,723; 4,265,763; 4,315,819; 4,430,219; 4,351,092; 4,367,139; 4,666,469; 4,707,267; 4,752,305; and 4,758,341; the relevant portions incorporated herein by reference. The membranes are sealingly mounted in a pressure vessel in such a manner that the membrane separates the vessel into two fluid regions wherein fluid flow between the two regions is accomplished by fluid permeating through the membrane. Under certain conditions, it may be highly desirable to provide support for the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the art. The membrane affixed to the frame can then be sealingly engaged in the conventional manner in a vessel so that the membrane surface inside the framing support separates two otherwise non-communicating regions in the vessel. One skilled in the art will recognize that the structure which supports the membrane can be an internal part of the vessel or even the outer edge of the membrane. The membrane divides the separation chamber into two regions, a high pressure side into which the feed gas mixture is introduced and a lower pressure side. One side of the membrane is contacted with a feed gas mixture under pressure, while a pressure differential is maintained across the membrane. In the embodiment wherein the membrane is in hollow fiber form, the feed gas mixture may be introduced on the outside or the inside of the hollow fiber. At least one component in the gas mixture selectively permeates through the membrane more rapidly than the other component(s) in the gas mixture. Gas which is enriched in the selectively permeating component(s) is thus obtained on the low pressure side of the membrane which is removed from the low pressure side of the membrane as permeate. Gas depleted in the selectively permeating component(s) is obtained on the high pressure side of the membrane which is removed from the high pressure side of the membrane as non-permeate.

The separation process is carried out at pressures and temperatures which do not deleteriously affect the membrane. Preferably, the pressure on the high pressure side of the membrane is between about 10 psig and about 1000 psig, more preferably between about 50 psig and about 500 psig. The temperature of the feed gas mixture is preferably between about 0° and about 150° C., more preferably between about 5° and about 100° C.

Gas permeability is defined as
$$P = \frac{(\text{amount of permeant})(\text{membrane thickness})}{(\text{area})(\text{time})(\text{driving force across the membrane})}.$$

A standard permeability measurement unit is the Barrer (Ba), which is equal to $$10^{-10} \frac{(\text{centimeter})^3(\text{STP})(\text{centimeter})}{(\text{centimeter})^2(\text{second})(\text{centimeter Hg})}.$$

abbreviated hereinafter as $$10^{-10} \frac{\text{cm}^3(\text{STP})\text{cm}}{\text{cm}^2 \, s \, \text{cmHg}}.$$

The reduced gas flux is defined as (permeability)÷(membrane thickness). A standard reduced flux unit is $$10^{-6} \frac{(\text{centimeter})^3(\text{STP})}{(\text{centimeter})^2(\text{second})(\text{centimeter Hg})}.$$

abbreviated hereinafter as $$10^{-6} \frac{\text{cm}^3(\text{STP})}{\text{cm}^2 \, s \, \text{cmHg}}.$$

The gas separation factor (selectivity) is defined as the ratio of the permeability or flux of the faster permeating gas to the permeability or flux of the slower permeating gas.

The membranes of this invention are particularly useful for separating hydrogen or helium from gas mixtures containing other gases such as nitrogen, carbon monoxide, carbon dioxide, water vapor, hydrogen sulfide, and/or light hydrocarbons. As used herein, the term light hydrocarbons refers to gaseous saturated and unsaturated $C_{1-4}$ hydrocarbons such as methane, ethane, ethylene, propane, propylene, butane, and butylene. The membranes of this invention preferably possess a separation factor at about 25° C. for hydrogen/light hydrocarbons of at least about 50, more preferably of at least about 100. The membranes of this invention preferably possess a separation factor at about 25° C. for helium/light hydrocarbons of at least about 50, more preferably of at least about 100. The membranes of this invention preferably possess a permeability for hydrogen of at least about 5 Barrers, more preferably of at least about 10 Barrers. The membranes of this invention preferably possess a permeability for helium of at least about 5 Barrers, more preferably of at least about 10 Barrers.

The membrane separation process of this invention may be combined with non-membrane separation processes such as cryogenics and pressure swing adsorption.

SPECIFIC EMBODIMENTS

The following Examples are included for illustrative purposes only and are not intended to limit the scope of the invention or Claims.

EXAMPLE 1

A polyimide is prepared using about 3.0 g cyclopentane dianhydride, 2.86 g oxydianiline, 15 ml N-methyl-2-pyrrolidinone, and 5 ml N-cyclohexyl-2-pyrrolidinone. A 250 ml three neck round bottom flask is equipped with a nitrogen inlet, overhead stirrer, Dean Stark trap, condenser, drying tube, thermometer, and silicone heating bath. The bath is preheated to about 180° C. The dianhydride and dianiline are added to the flask and washed with the pyrrolidinone solvents. The solution is heated to about 175°-195° C. for about 48 hours. The resulting viscous dark brown solution is cooled, diluted to about 10 weight percent solids with dimethylformamide, filtered, and added dropwise to rapidly stirred methanol to precipitate the polymer. The fluffy white powder thus obtained is then filtered, washed with methanol, and dried in a vacuum oven.

A film is prepared by dissolving about 10 weight percent polymer in dimethylacetamide, followed by casting the solution onto a glass plate to form a film. After substantial solvent evaporation, the film is heated for about 1 hour at about 300° C. under vacuum to remove residual solvent. A nominal 1.5 inch (3.8 centimeter) diameter disc cut from the cast film is then evaluated for gas separation performance using a constant-volume variable-pressure gas permeability apparatus operated at about 50 psig feed pressure and about 30° C. with pure single gas feed. For a description of the constant-volume variable-pressure gas permeability test method, see Pye, Hoehn, and Panar, "Measurement of Gas Permeability of Polymers. I. Permeabilities in Constant-Volume/Variable Pressure Apparatus," *Journal of Applied Polymer Science*, Vol. 20, 1976, pp. 1921-1931, the relevant portions relating to gas permeability measurement incorporated herein by reference. Data are reported in Table I.

EXAMPLE 2

A polyimide is prepared by reacting bicyclo-[2,2,2]-7-octene-2,3,5,6-tetracarboxylic dianhydride, about 3.1000 g, 4,4'-oxydianiline, 2.5010 g, N-methyl-2-pyrrolidinone, 30 ml, and N-cyclohexyl-2-pyrrolidinone, 6 ml, in a 250 ml round bottom flask equipped as in Example 1. The reactants are added to the reaction flask and the solution heated to about 185° C. During the later stages of the reaction, the polymer tends to precipitate. However, cooling the viscous solution to about 150° C. allowed the polymer to redissolve, indicating the presence of a critical solution temperature. After about 24 hours reaction time, the polymer is isolated via precipitation in a stirred methanol solution. A creasable film is formed by dissolving the polyimide in dimethylacetamide, casting the solution onto a glass plate, and evaporating the solvent under vacuum conditions. The film is then removed from the glass plate and heat treated under vacuum at about 300° for about 2 hours. The film is evaluated for gas separation properties as described in Example 1.

EXAMPLE 3

A polyimide is prepared by reacting Epiclon ™ B-4400 5-(2,5-dioxotetrahydro-3-foranyl)-3-cyclohexene-1,2-dicarboxylic anhydride (™ trademark of Dainippon Ink & Chemicals, Inc., available through Chrishev Company, Leawood, Kans.), about 3.0000 g, 4,4'-oxydianiline, about 2.2735 g, N-methyl-2-pyrrolidinone, about 15 ml, and N-cyclohexyl-2-pyrrolidinone, about 5 ml. Procedures for preparing, isolating, and processing the polyimide are similar to that described in Example 1.

EXAMPLE 4

A polyimide is prepared by reacting 9,9'-bis-4-aminophenylfluorene, about 2.1000 g, bicyclo[2,2,2]-7-octene-2,3,5,6,-tetracarboxylic dianhydride, about 1.4958 g, N-methyl-2-pyrrolidinone, about 20 ml, and N-cyclohexyl-2-pyrrolidinone, about 4.5 ml. Procedures for preparing, isolating, and processing the polyimide are similar to that described in Example 1, except that, because this polymer is reacted at lower solids content, about 12.5 weight percent, the reaction solution is not diluted further prior to polymer isolation.

TABLE I

| Example | He Permeability (Barrers) | He$_2$/CH$_4$ Separation Factor |
| --- | --- | --- |
| 1 | 6.5 | 410 |
| 2 | 15.2 | 117 |
| 3 | 7.6 | 161 |
| 4 | 41 | 70 |

What is claimed is:

1. A process of separating gases comprising:
   (1) contacting one side of a semi-permeable gas separation membrane with a feed gas mixture under pressure, wherein the membrane divides a separation chamber into a high pressure side into which the feed gas mixture is fed and a low pressure side;
   (2) maintaining a pressure differential across the membrane under conditions such that at least one component in the feed gas mixture selectively permeates through the membrane from the high pressure side to the low pressure side of the membrane;
   (3) removing from the low pressure side of the membrane permeated gas which is enriched in the selectively permeating component(s); and
   (4) removing from the high pressure side of the membrane non-permeated gas which is depleted in the selectively permeating component(s);

wherein the membrane comprises a thin discriminating layer of a polyimide corresponding to the formula:

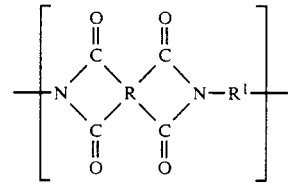

and R is the tetravalent residue of an alicyclic dianhydride in which:
   A. both anhydride moieties of the dianhydride are directly attached to the alicyclic ring structure through ortho-linkages, or
   B. one anhydride moiety is directly attached to the alicyclic ring structure and the alicyclic ring structure possesses at least one degree of unsaturation; and R$^1$ is the divalent residue of an aliphatic, alicyclic, or aromatic diamine.

2. The process of claim 1 wherein R is the tetravalent residue of an alicyclic dianhydride, wherein said dianhydride is selected from the group consisting of:

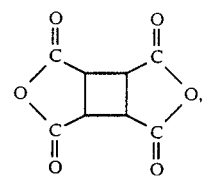

-continued

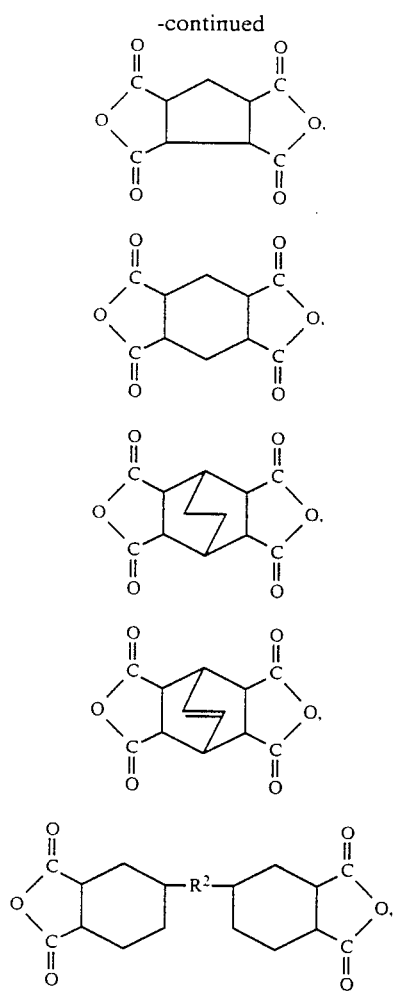

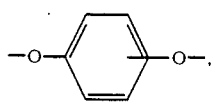

wherein $R^2$ is —, —O—, —CO—, —S—, —SO$_2$—,

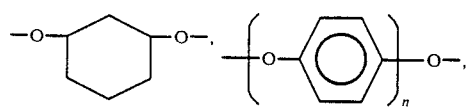

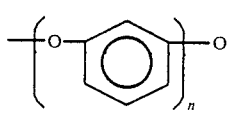

a $C_{1-6}$ divalent hydrocarbon radical, or a $C_{1-6}$ halo-substituted hydrocarbon radical, and n is 1, 2, or 3,

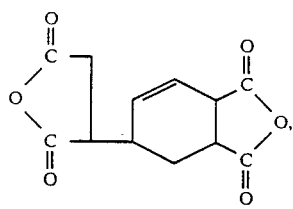

-continued

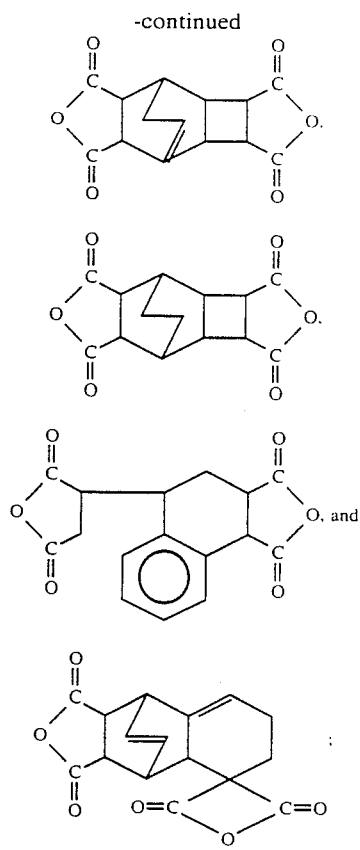

wherein the inertly substituted groups on the dianhydride comprise $C_{1-4}$ alkyl.

3. The process of claim 2 wherein the polyimide is derived from an alicyclic dianhydride and an aromatic diamine.

4. The process of claim 3 wherein the aromatic diamine is selected from the group consisting of:

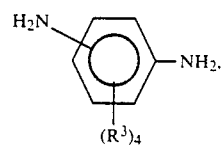

wherein $R^3$ is independently in each occurrence hydrogen, a $C_{1-4}$ alkyl, or a halogen,

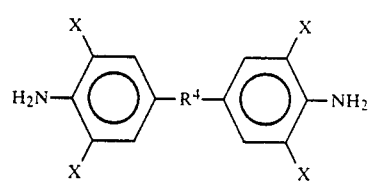

or

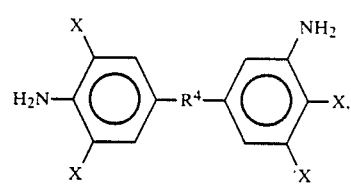

wherein R⁴ is —, —O—, —CO—, —SO₂—, —S—,

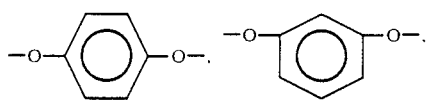

a C₁₋₆ divalent hydrocarbon radical, or a C₁₋₆ halo-substituted hydrocarbon radical, and X is independently in each occurence hydrogen, a C₁₋₄ alkyl, or a halogen, and n is 1, 2, or 3, and

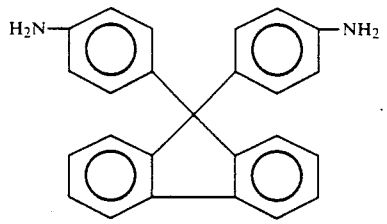

5. The process of claim 4 wherein the feed gas mixture contains at least one of the gases selected from the group consisting of hydrogen, helium, oxygen, nitrogen, carbon monoxide, carbon dioxide, water vapor, hydrogen sulfide, ammonia, and light hydrocarbons.

6. The process of claim 5 wherein the pressure of the feed gas mixture is between about 5 and about 1000 psig.

7. The process of claim 6 wherein the temperature of the feed gas mixture is between about 0° and about 150° C.

8. A semi-permeable gas separation membrane comprising a thin discriminating layer of an aliphatic polyimide having repeating units corresponding to the formula:

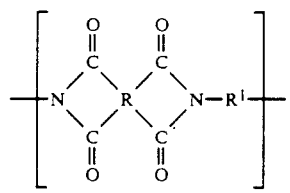

wherein R is the tetravalent residue of an alicyclic dianhydride in which:
  A. both anhydride moieties of the dianhydride are directly attached to the alicyclic ring structure through ortho-linkages, or
  B. one anhydride moiety is directly attached to the alicyclic ring structure and the alicyclic ring structure possesses at least one degree of unsaturation; and
R¹ is the divalent residue of an aliphatic, alicyclic, or aromatic diamine.

9. The membrane of claim 8 wherein R is the tetravalent residue of an unsubstituted or inertly substituted alicyclic dianhydride selected from the group consisting of:

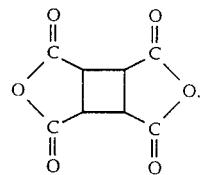

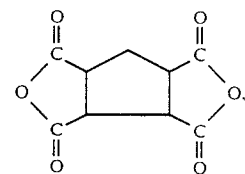

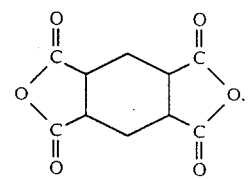

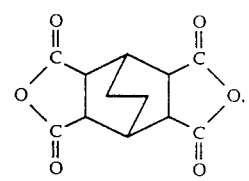

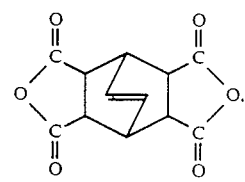

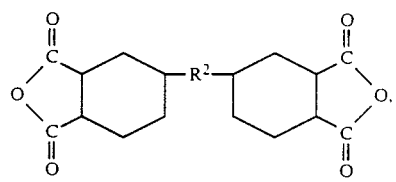

wherein R² is —, —O—, —CO—, —S—, —SO₂—,

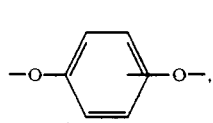

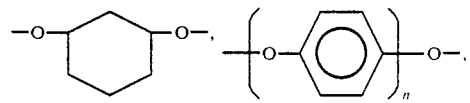

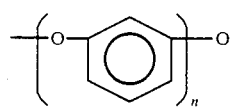

a C₁₋₆ divalent hydrocarbon radical, or a C₁₋₆ halo-substituted hydrocarbon radical, and n is 1, 2, or 3,

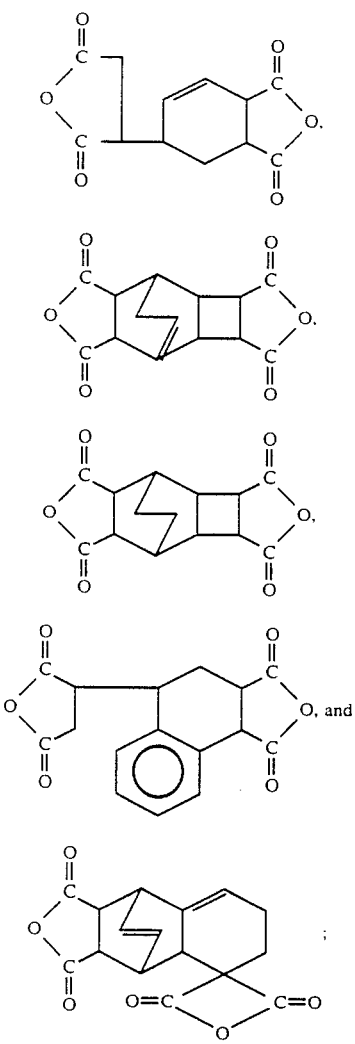

wherein the inertly substituted groups on the dianhydride comprise $C_{1-4}$ alkyl.

10. The membrane of claim 9 wherein the polyimide is derived from an alicyclic dianhydride and an aromatic diamine.

11. The membrane of claim 10 wherein the polyimide is derived from an alicyclic dianhydride and an aromatic diamine selected from the group consisting of:

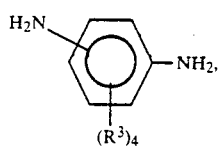

wherein $R^3$ is independently in each occurrence hydrogen, a $C_{1-4}$ alkyl, or a halogen,

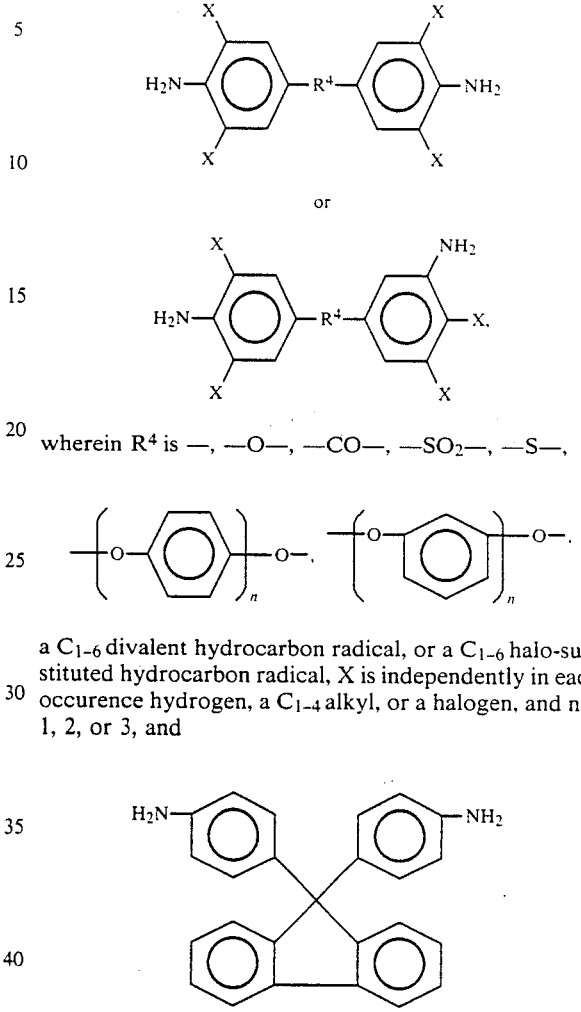

wherein $R^4$ is —, —O—, —CO—, —SO$_2$—, —S—, a $C_{1-6}$ divalent hydrocarbon radical, or a $C_{1-6}$ halo-substituted hydrocarbon radical, X is independently in each occurence hydrogen, a $C_{1-4}$ alkyl, or a halogen, and n is 1, 2, or 3, and 12. The membrane of claim 11 wherein the membrane is composite or asymmetric.

13. The membrane of claim 12 wherein the membrane is a hollow fiber.

14. The membrane of claim 13 wherein the separation factor for hydrogen/light hydrocarbons at about 25° C. is at least about 50.

15. The membrane of claim 14 wherein the permeability for hydrogen is at least about 5 Barrers.

16. The membrane of claim 13 wherein the separation factor for helium/light hydrocarbons at about 25° C. is at least about 50.

17. The membrane of claim 16 wherein the permeability for helium is at least about 5 Barrers.

* * * * *